US010893336B2

(12) United States Patent
Arunkumar et al.

(10) Patent No.: US 10,893,336 B2
(45) Date of Patent: Jan. 12, 2021

(54) CUSTOMIZED CAPTIONING FOR CLIENT DEVICE

(71) Applicant: ARRIS Enterprises, Inc., Suwanee, GA (US)

(72) Inventors: Lakshmi Arunkumar, Bangalore (IN); Krishna Prasad Panje, Bangalore (IN)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

(21) Appl. No.: 14/615,834

(22) Filed: Feb. 6, 2015

(65) Prior Publication Data
US 2016/0234562 A1  Aug. 11, 2016

(51) Int. Cl.
| | | |
|---|---|---|
| *H04N 21/2343* | (2011.01) | |
| *H04N 21/25* | (2011.01) | |
| *H04N 21/258* | (2011.01) | |
| *H04N 21/414* | (2011.01) | |
| *H04N 21/422* | (2011.01) | |
| *H04N 21/43* | (2011.01) | |
| *H04N 21/488* | (2011.01) | |
| *H04N 21/485* | (2011.01) | |
| *H04N 21/41* | (2011.01) | |
| *H04N 21/435* | (2011.01) | |
| *H04N 21/472* | (2011.01) | |

(52) U.S. Cl.
CPC ..... *H04N 21/4858* (2013.01); *H04N 21/4126* (2013.01); *H04N 21/4358* (2013.01); *H04N 21/4854* (2013.01); *H04N 21/4856* (2013.01); *H04N 21/47205* (2013.01)

(58) Field of Classification Search
None
See application file for complete search history.

(56) References Cited

U.S. PATENT DOCUMENTS

| | | | | |
|---|---|---|---|---|
| 2006/0017845 | A1* | 1/2006 | Onomatsu | H04N 21/47 348/468 |
| 2008/0247726 | A1* | 10/2008 | Lee | G11B 27/036 386/282 |
| 2010/0299681 | A1* | 11/2010 | Maskatia | H04N 21/4755 719/328 |
| 2013/0111528 | A1* | 5/2013 | Baskaran | H04N 21/4884 725/61 |
| 2013/0300842 | A1* | 11/2013 | Suh | H04N 19/597 348/51 |
| 2014/0201631 | A1* | 7/2014 | Pornprasitsakul | G11B 27/031 715/716 |
| 2015/0269236 | A1* | 9/2015 | Rosen | G06F 19/00 707/602 |

* cited by examiner

*Primary Examiner* — Brian T Pendleton
*Assistant Examiner* — Jean D Saint Cyr
(74) *Attorney, Agent, or Firm* — Buchanan Ingersoll & Rooney PC

(57) ABSTRACT

Methods, systems, and computer readable media can be operable to facilitate the generation and output of customized caption data, the caption data being customized for a specific client device. Caption data associated with requested content can be edited at a customer premise equipment device according to caption settings associated with the requesting client device. Caption settings associated with the requesting client device can be determined based upon user-input or caption settings previously used for the requesting client device.

12 Claims, 4 Drawing Sheets

US 10,893,336 B2

CUSTOMIZED CAPTIONING FOR CLIENT DEVICE

TECHNICAL FIELD

This disclosure relates to delivering customized captioning to a client device.

BACKGROUND

Typically, a set-top box (STB) is designed to allow a subscriber to enable captioning, such as closed captioning, and to adjust display settings associated with captioning. A subscriber can adjust various caption settings (e.g., window color, window opacity, font color, font size, window position, aspect ratio, etc.), and the STB can apply the subscriber-specific settings to programming that is output from the STB to the subscriber.

Unlike a STB, client devices (e.g., portable computers, tablets, mobile devices, etc.) generally do not provide a user with the ability to adjust caption settings, and are thus dependent upon caption settings that are established for a corresponding STB. Further, a subscriber may prefer that different caption settings are applied to content viewed on a client device than caption settings applied to content viewed on a display device (e.g., television) connected to a STB. Using the same caption settings for both content that is output to a subscriber through a STB and content displayed on a client device can cause the captions to be illegible or undesirable for a user. Therefore, a need exists for improving methods and systems for facilitating the delivery of captioning that is customized for a client device requesting content.

BRIEF DESCRIPTION OF THE DRAWINGS

Like reference numbers and designations in the various drawings indicate like elements.

DETAILED DESCRIPTION

It is desirable to improve upon methods and systems for delivering captioning within a content stream to a client device. Methods and systems are described herein for editing captioning for content according to customized settings associated with a client device requesting the content. In embodiments, caption settings associated with various client devices can be stored at a customer premise equipment (CPE) device, and the CPE device can output a content stream comprising customized captioning to a client device.

Figure 1:
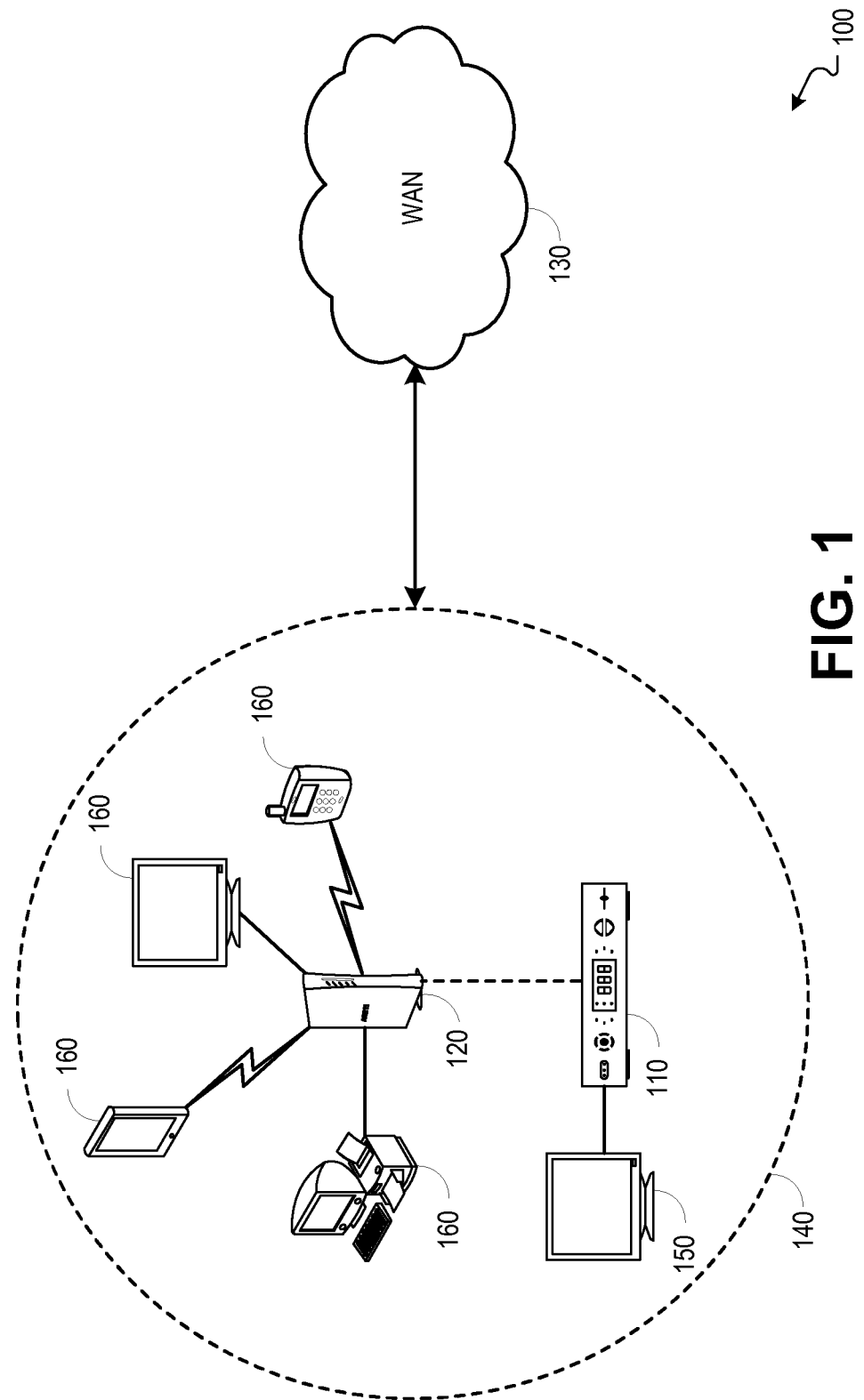
FIG. 1 is a block diagram illustrating an example network environment operable to facilitate the delivery of customized captioning to a client device.

FIG. 1 is a block diagram illustrating an example network environment 100 operable to facilitate the delivery of customized captioning to a client device. In embodiments, one or more CPE devices (e.g., STB 110, gateway 120, other devices that are not shown such as a modem, a wireless router including an embedded modem, digital subscriber line (DSL) modem, video game console, digital versatile disc (DVD) player, communications device, hotspot device, etc.) provide video services (e.g., streaming or broadcast content, video on demand (VoD) content, stored or recorded content, etc.) to a subscriber by communicating with a wide area network (WAN) 130 through a connection to a network 140 (e.g., a local area network (LAN), a wireless local area network (WLAN), a personal area network (PAN), etc.). For example, a subscriber can receive and request content through a STB 110, or through a television 150 connected to a STB 110. In embodiments, a STB 110 or gateway 120 can receive content that is broadcast, multicast or unicast to the network 140.

In embodiments, a subscriber can receive and request content from client devices 160 (e.g., computer, tablet, television, mobile device, etc.) through a connection to a gateway 120. In embodiments, a gateway 120 can communicate with a STB 110 over a wired or a wireless connection, and content received at or stored on the STB 110 can be output from the STB 110 to one or more of the client devices 160. While the components shown in FIG. 1 are shown separate from each other, it should be understood that the various components can be integrated into each other (e.g., the gateway 120 can be integrated into a STB 110).

In embodiments, caption data associated with content requested from a STB 110 by a client device 160 can be edited or re-configured according to caption settings that are customized by a subscriber for the requesting client device 160. For example, a subscriber can input caption settings associated with a specific client device through a device connected to a STB 110 (e.g., television 150), and previously used caption settings associated with a specific client device can be stored at the STB 110. In embodiments, a subscriber can preview a display of captioning and/or content that will result from caption settings associated with a client device. For example, a subscriber can preview captioning through a device connected to a STB 110 (e.g., television 150) or through the client device 160 for which the captioning is customized. In embodiments, requested content along with caption data customized for a requesting client device 160 can be output from a STB 110 or gateway 120 to the requesting client device 160.

Figure 2:
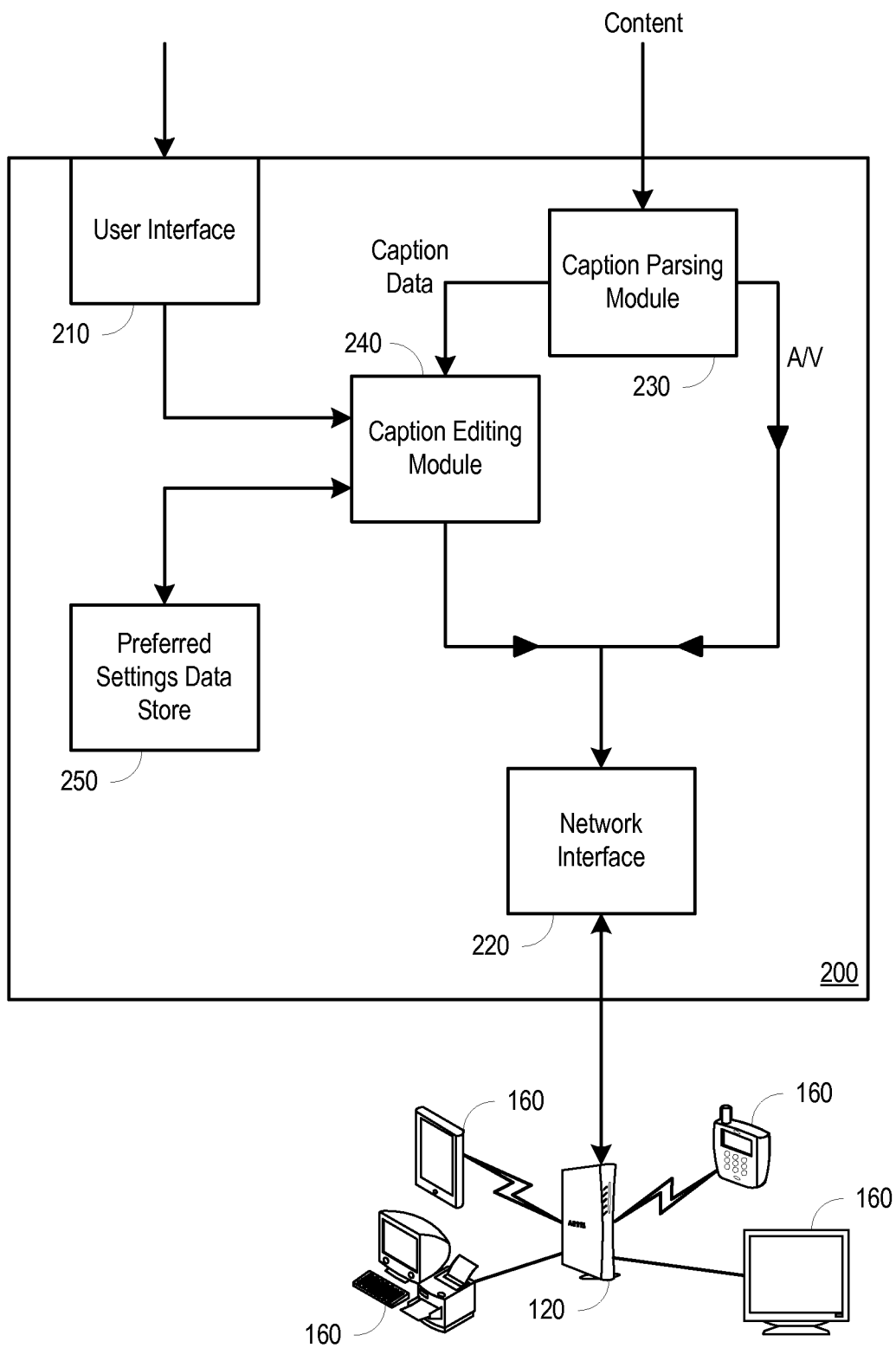
FIG. 2 is a block diagram illustrating an example component operable to edit captioning according to customized settings associated with a client device.

FIG. 2 is a block diagram illustrating an example component 200 operable to edit captioning according to customized settings associated with a client device. The component 200 can include a user interface 210, a network interface 220, a caption parsing module 230, a caption editing module 240, and a preferred settings data store 250. In embodiments, the component 200 is within a STB 110 of FIG. 1 or a gateway 120.

In embodiments, the component 200 can receive a request for content through the user interface 210. For example, the request can be received from a client device 160. Requested content can be content that is streamed to a requesting client device 160 as the content is received by a CPE device from an upstream network or server (e.g., WAN 130 of FIG. 1) or content that is recorded and/or stored on a CPE device (e.g., STB 110 of FIG. 1 or gateway 120). In embodiments, the requested content may include caption data (e.g., caption service descriptor, caption command parameters, etc.) and audio/video data.

In embodiments, the caption parsing module 230 can receive content and can parse caption data from audio/video data associated with the content. For example, the caption parsing module 230 can identify a caption service descriptor within a table (e.g., program map table (PMT), event information table (EIT), etc.) associated with the content and caption commands within picture user data associated with the video. In embodiments, the caption parsing module 230 can identify and separate caption commands from the content stream.

In embodiments, the caption editing module 240 can identify a client device requesting the content, can receive caption commands associated with the requested content and can edit the caption commands according to caption settings associated with the client device 160 from which the request for the content is received. In embodiments, the caption editing module can receive caption settings associated with a client device from a user through the user interface 210. For example, the user can be presented with the option to input customized settings for various parameters (e.g., when to hide and when to display a caption window, delay between audio and captioning, font size, font color, window size, window color, justification, print direction, word wrap, opacity, anchors, aspect ratio, etc.) associated with the display of captions on a specific client device. In embodiments, the caption editing module 240 can identify and retrieve caption settings associated with a specific client device from the preferred settings data store 250. For example, when a request for content is received from a client device, the caption editing module 240 can check whether preferred caption settings for the specific client device are stored within the preferred settings data store 250.

In embodiments, previously or most-recently used caption settings associated with one or more client devices can be stored at the preferred settings data store 250. In embodiments, the caption editing module 240 can retrieve preferred caption settings for a specific client device from the preferred settings data store 250. In embodiments, caption settings associated with a client device that are input by a user can be added to the preferred settings data store 250. When a user inputs caption settings for a client device that differ from caption settings for the client device that are stored in the preferred settings data store 250, the caption settings input by the user, being the more recent caption settings, can be saved as the preferred caption settings for the client device in the preferred settings data store 250.

In embodiments, a preview of a display resulting from the caption settings for the client device can be output to a user by streaming edited caption data, along with audio/video data associated with the requested content, to the user. For example, the user can be presented with a display showing captioning as it would appear on the corresponding client device using the currently applied caption settings. The user can be presented with the preview through a device (e.g., television 150 of FIG. 1) connected to a STB 110 of FIG. 1, or through a client device 160 connected to a gateway 120, such as the client device from which a request for content is received.

In embodiments, a user can be presented with an option to either accept or reject the currently applied caption settings for the client device based upon the preview of the captioning. If the user rejects the caption settings, the user can input updated caption settings, and the caption data associated with the requested content can be edited according to the updated caption settings. If the user accepts the caption settings, the edited caption data, along with the audio/video data, associated with the requested content can be streamed to the client device requesting the content. For example, a content stream comprising edited caption data and audio/video data can be output to a requesting client device through the network interface 220.

Figure 3:
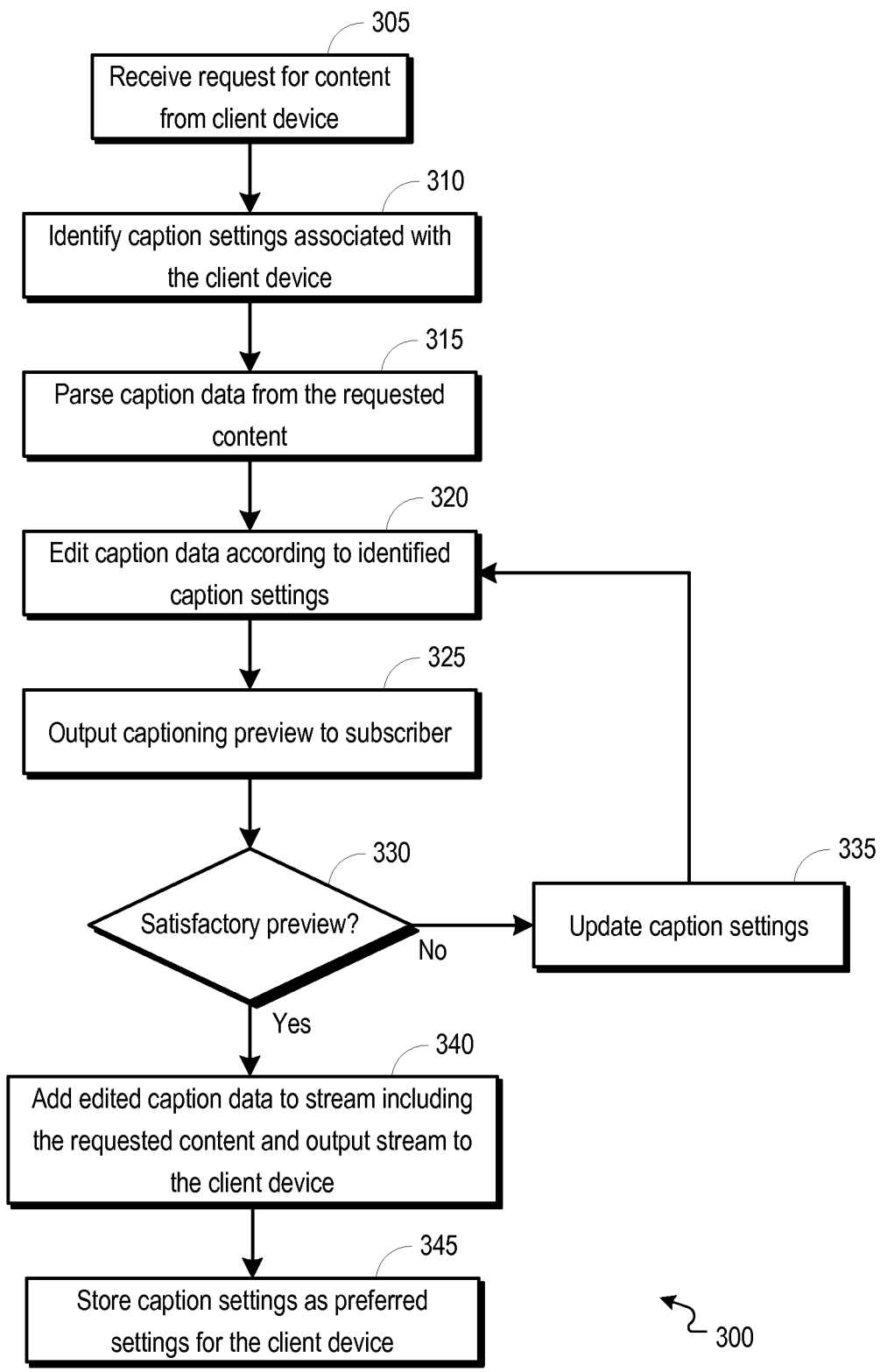
FIG. 3 is a flowchart illustrating an example process operable to facilitate the delivery of customized captioning to a client device.

FIG. 3 is a flowchart illustrating an example process 300 operable to facilitate the delivery of customized captioning to a client device. The process 300 can begin at 305, when a request for content is received from a client device (e.g., client device 160 of FIG. 1). For example, a STB 110 of FIG. 1 or gateway 120 of FIG. 1 can receive a request for content from a client device 160 through a network interface 220 of FIG. 2. In embodiments, the request for content is a request for a program that is output to the client device 160 as the STB 110 or gateway 120 receives it, or a request for a program that is stored on the STB 110 or gateway 120.

At 310, caption settings associated with the client device can be identified. In embodiments, caption settings associated with the client device can be received as input from a subscriber. For example, a subscriber can set caption settings associated with a client device while viewing a program through a STB 110 of FIG. 1 or gateway 120 of FIG. 1. The STB 110 or gateway 120 can present the subscriber with options for various caption settings (e.g., window color, window opacity, font color, font size, window position, aspect ratio, etc.) and can also present the subscriber with a preview of how the captioning will appear on the specified client device. In embodiments, caption settings associated with the client device can be retrieved from storage (e.g., preferred settings data store 250 of FIG. 2), wherein the storage includes preferred caption settings for one or more client devices.

At 315, caption data can be parsed from the requested content. Caption data can be parsed from the requested content, for example, by the caption parsing module 230 of FIG. 2. In embodiments, the caption parsing module 230 can separate caption data (e.g., caption service descriptor, caption command parameters, etc.) from audio/video data. For example, the caption parsing module 230 can identify caption data based upon information held within a table (e.g., PMT, EIT, etc.) associated with the requested content.

At 320, caption data can be edited according to the identified caption settings associated with the client device. The caption data can be edited, for example, by the caption editing module 240 of FIG. 2. In embodiments, the caption editing module 240 of FIG. 2 can edit caption data parsed from the associated content by modifying parameters within the caption data according to the identified caption settings associated with the client device requesting the content.

At 325, a captioning preview can be output to a subscriber, the captioning preview showing a display of captioning resulting from the identified caption settings. In embodiments, a captioning preview can be displayed on a device (e.g., television 150) connected to a STB 110 or gateway 120, and the display can show a preview of the captioning as it would appear on the client device requesting the content. In embodiments, a captioning preview can be output to and displayed on the client device 160 requesting the content.

At 330, a determination can be made whether the captioning preview is satisfactory. In embodiments, a subscriber can be presented with the option to either accept or reject the current caption settings. The determination whether the captioning preview is satisfactory can be based on the subscriber's preference for the appearance (e.g., font, font color, window color, aspect ratio, etc.) and/or functionality (e.g., window size, on-screen position during playback of content, etc.) of the captioning.

If, at 330, the determination is made that the captioning preview is not satisfactory, the process 300 can proceed to 335. At 335, caption settings can be updated to correct elements of the captioning that are deemed unsatisfactory. In embodiments, a STB 110 or gateway 120 can receive subscriber modifications to caption settings associated with the client device through a user interface 210 of FIG. 2. After caption settings associated with the client device are updated, the process 300 can return to 320 where caption data is edited according to the updated caption settings.

Returning to 330, if the determination is made that the captioning preview is satisfactory, the process 300 can proceed to 340. At 340, edited caption data can be added to the requested content and the requested content, including the edited caption data, can be output to the client device requesting the content. In embodiments, caption data within a table (e.g., PMT, ETI, etc.) associated with the requested content can be modified, and the modified caption data can be streamed to a requesting client device along with audio/video data associated with the requested content. In embodiments, caption command data within picture user data associated with the requested video content can be modified, and the modified caption command data can be streamed to a requesting client device along with audio/video data associated with the requested content.

At 345, the caption settings associated with the client device can be stored as preferred settings for the client device. The caption settings can be stored, for example, at the preferred settings data store 250 of FIG. 2. In embodiments, the caption settings can overwrite previously stored caption settings for the associated client device.

Figure 4:
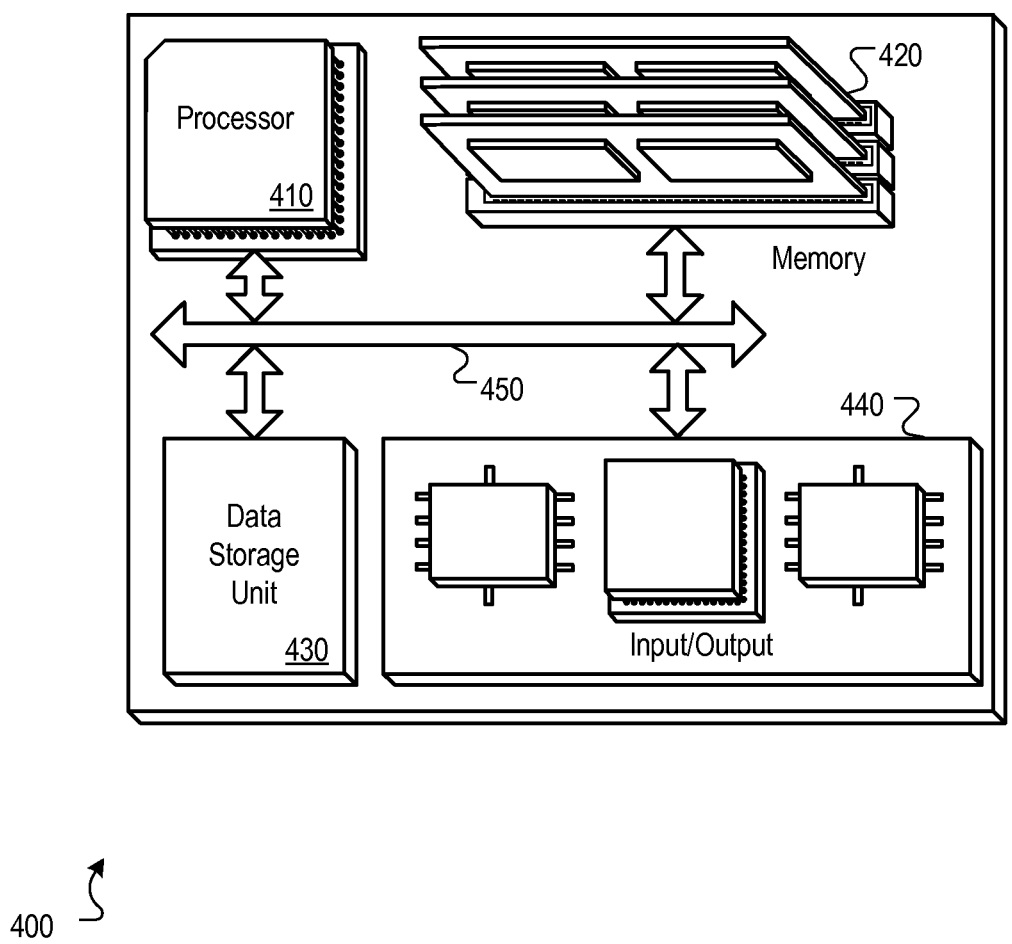
FIG. 4 is a block diagram of a hardware configuration operable to facilitate the delivery of customized captioning to a client device.

FIG. 4 is a block diagram of a hardware configuration 400 operable to facilitate the delivery of customized captioning to a client device. The hardware configuration 400 can include a processor 410, a memory 420, a storage device 430, and an input/output device 440. Each of the components 410, 420, 430, and 440 can, for example, be interconnected using a system bus 450. The processor 410 can be capable of processing instructions for execution within the hardware configuration 400. In one implementation, the processor 410 can be a single-threaded processor. In another implementation, the processor 410 can be a multi-threaded processor. The processor 410 can be capable of processing instructions stored in the memory 420 or on the storage device 430.

The memory 420 can store information within the hardware configuration 400. In one implementation, the memory 420 can be a computer-readable medium. In one implementation, the memory 420 can be a volatile memory unit. In another implementation, the memory 420 can be a non-volatile memory unit.

In some implementations, the storage device 430 can be capable of providing mass storage for the hardware configuration 400. In one implementation, the storage device 430 can be a computer-readable medium. In various different implementations, the storage device 430 can, for example, include a hard disk device, an optical disk device, flash memory or some other large capacity storage device. In other implementations, the storage device 430 can be a device external to the hardware configuration 400.

The input/output device 440 provides input/output operations for the hardware configuration 400. In one implementation, the input/output device 440 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a subscriber device (e.g, television 150 of FIG. 1, client devices 160*a-d* of FIG. 1, etc.). In another implementation, the input/output device can include driver devices configured to send communications to, and receive communications from one or more networks (e.g., network 140, WAN 130 of FIG. 1).

Those skilled in the art will appreciate that the invention improves upon methods and systems for displaying captions on a client device. The methods, systems, and apparatuses described in this disclosure enable customized caption settings, the settings being customized for a requesting client device, to be applied to requested content at a customer premise equipment device, and the customized caption data can be streamed, along with the requested content, to the requesting client device.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
   receiving a request for content from a client device, wherein the client device comprises a mobile device, wherein the request is received at a customer premise equipment device and the content comprises caption data, and wherein the customer premise equipment device comprises a set-top box;
   identifying, at the customer premise equipment device, the client device from which the request for content is received;
   determining that caption settings associated with the client device are stored at the customer premise equipment device, wherein the caption settings comprise one or more customized parameter settings that are associated with one or more parameters that control one or more visual characteristics associated with a display of caption content at the client device including when to hide and when to display a caption window displaying the caption data, and wherein the caption settings are configured at the customer premise equipment device before the request for content is received from the client device, the configuration of the caption settings comprising:
   receiving one or more caption parameters to be associated with the client device, including when to hide and when to display a caption window displaying the caption data;
   generating a caption preview, the caption preview comprising a display of caption content that is formatted according to the caption settings associated with the client device, thereby providing a display of the caption content as the caption content would be perceived by a user when the caption content is displayed at the client device;
   outputting the caption preview to a display device that is connected to the customer premise equipment device, wherein the display device is a different device than the client device;
   receiving confirmation of user-approval of the displayed caption preview; and
   upon confirmation of the user-approval of the displayed caption preview, saving the association between the caption settings and the client device; and
   in response to determining that caption settings associated with the client device are stored at the customer premise equipment device:
   parsing the caption data from the content, wherein the caption data is parsed from a table associated with the content, and wherein the caption data comprises a caption service descriptor and one or more caption commands;
   generating edited caption data by overwriting one or more of the caption commands according to the caption settings associated with the client device;
   consolidating the edited caption data with the requested content; and
   outputting the consolidated edited caption data and requested content to the client device.

2. The method of claim 1, wherein the caption settings associated with the client device are determined based upon one or more caption parameters input at the customer premise equipment device.

3. The method of claim 1, wherein the caption settings associated with the client device are retrieved from a data store, the data store comprising caption settings previously applied to caption data associated with the client device.

4. The method of claim 1, further comprising:
   storing the edited caption data as preferred caption data associated with the client device.

5. A customer premise equipment device comprising:
   an interface configured to be used to receive a request for content from a client device, wherein the client device comprises a mobile device, wherein the content comprises caption data;
   a caption editing module configured to:
   identify the client device from which the request for content is received;
   determine that caption settings associated with the client device are stored at the customer premise equipment device, wherein the caption settings comprise one or more customized parameter settings that are associated with one or more parameters that control one or more visual characteristics associated with a display of caption content at the client device including when to hide and when to display a caption window displaying the caption data, and wherein the caption settings are configured at the customer premise equipment device before the request for content is received from the client device, the configuration of the caption settings comprising:

receive one or more caption parameters to be associated with the client device including when to hide and when to display a caption window displaying the caption data;

generate a caption preview, the caption preview comprising a display of caption content that is formatted according to the caption settings associated with the client device, thereby providing a display of the caption content as the caption content would be perceived by a user when the caption content is displayed at the client device;

output the caption preview to a display device that is connected to the customer premise equipment device, wherein the display device is a different device than the client device;

receive confirmation of user-approval of the displayed caption preview;

upon confirmation of the user-approval of the displayed caption preview, save the association between the caption settings and the client device; and in response to determining that caption settings associated with the client device are stored at the customer premise equipment device:

parse the caption data from the content, wherein the caption data is parsed from a table associated with the content, and wherein the caption data comprises a caption service descriptor and one or more caption commands;

generate edited caption data by overwriting one or more of the caption commands according to the caption settings associated with the client device; and consolidate the edited caption data with the requested content; and an output interface configured to be used to output the consolidated edited caption data and requested content to the client device.

6. The apparatus of claim 5, wherein the caption settings associated with the client device are determined based upon user-input, the user-input comprising one or more caption parameters.

7. The apparatus of claim 5, wherein the caption settings associated with the client device are retrieved from a data store comprising caption settings previously applied to caption data associated with the client device.

8. The apparatus of claim 5, further comprising:
a data store configured to store the edited caption data as preferred caption data associated with the client device.

9. One or more non-transitory computer readable media having instructions operable to cause one or more processors to perform operations comprising:

receiving a request for content from a client device, wherein the client device comprises a mobile device, wherein the request is received at a customer premise equipment device and the content comprises caption data, and wherein the customer premise equipment device comprises a set-top box;

identifying, at the customer premise equipment device, the client device from which the request for content is received;

determining that caption settings associated with the client device are stored at the customer premise equipment device, wherein the caption settings comprise one or more customized parameter settings associated with one or more parameters that control one or more visual characteristics associated with a display of caption content at the client device including when to hide and when to display a caption window displaying the caption data, and wherein the caption settings are configured at the customer premise equipment device before the request for content is received from the client device, the configuration of the caption settings comprising:

receiving one or more caption parameters to be associated with the client device, including when to hide and when to display a caption window displaying the caption data;

generating a caption preview, the caption preview comprising a display of caption content that is formatted according to the caption settings associated with the client device, thereby providing a display of the caption content as the caption content would be perceived by a user when the caption content is displayed at the client device;

outputting the caption preview to a display device that is connected to the customer premise equipment device, the caption preview comprising a display of caption content that is formatted according to the caption settings associated with the client device, thereby providing a display of the caption content as the caption content would be perceived by a user when the caption content is displayed at the client device, wherein the display device is a different device than the client device;

receiving confirmation of user-approval of the displayed caption preview; and upon confirmation of the user-approval of the displayed caption preview, saving the association between the caption settings and the client device; and in response to determining that caption settings associated with the client device are stored at the customer premise equipment device:

parsing the caption data from the content, wherein the caption data is parsed from a table associated with the content, and wherein the caption data comprises a caption service descriptor and one or more caption commands;

generating edited caption data by overwriting one or more of the caption commands according to the caption settings associated with the client device;

consolidating the edited caption data with the requested content; and outputting the consolidated edited caption data and requested content to the client device.

10. The one or more non-transitory computer-readable media of claim 9, wherein the caption settings associated with the client device are determined based upon one or more caption parameters input at the customer premise equipment device.

11. The one or more non-transitory computer-readable media of claim 9, wherein the caption settings associated with the client device are retrieved from a data store comprising caption settings previously applied to caption data associated with the client device.

12. The one or more non-transitory computer-readable media of claim 9, wherein the instructions are further operable to cause one or more processors to perform operations comprising:

storing the edited caption data as preferred caption data associated with the client device.

* * * * *